United States Patent [19]

Tsutsui et al.

[11] Patent Number: 4,739,923
[45] Date of Patent: Apr. 26, 1988

[54] HOT/COLD WATER MIXING DEVICE

[75] Inventors: Osamu Tsutsui; Yukihiro Muroya; Hirofumi Takeuchi; Keiji Hayashi, all of Fukuoka, Japan

[73] Assignee: Toto Ltd., Fukuoka, Japan

[21] Appl. No.: 80,749

[22] Filed: Jul. 31, 1987

[30] Foreign Application Priority Data

Aug. 1, 1986 [JP] Japan .................. 61-181573
Aug. 21, 1986 [JP] Japan .................. 61-196355

[51] Int. Cl.$^4$ .......................................... G05D 23/185
[52] U.S. Cl. ................... 236/12.12; 236/78 C; 318/619; 364/502
[58] Field of Search ............... 236/12.12, 78 D, 78 C; 364/502, 510; 137/88; 318/619

[56] References Cited

U.S. PATENT DOCUMENTS 3,505,606  4/1970  Werner ........................ 318/619 X
4,420,811  12/1983 Tarnay et al. .................. 364/502 X
4,653,538  3/1986  Tsutsui et al.
4,693,415  9/1987  Sturm ............................. 137/88 X Primary Examiner—William E. Wayner
Attorney, Agent, or Firm—Bogucki, Scherlacher, Mok & Roth

[57] ABSTRACT

A hot/cold water mixing device includes a hot water supply valve disposed in a hot water feed pipe for regulating the amount of hot water passing therethrough, a cold water supply valve disposed in a cold water feed pipe for regulating the amount of cold water passing therethrough, a water mixture pipe connected between the hot and cold water feed pipes and a water outlet, and a control mechanism for controlling an actuating mechanism to open and close the hot and cold water supply valves complementarily to each other. The control mechanism has a mechanism for storing a plurality of characteristics including, at least, a first characteristic having a relatively small gain with respect to the difference between a desired temperature for water discharged from the water outlet and the temperature of water in the water mixture pipe, and a second characteristic having a relatively large gain with respect to the difference, a characteristic selecting and maintaining mechanism for selecting and maintaining the second characteristic when the absolute value of the difference exceeds a relatively large value and for selecting and maintaining the first characteristic when the sign of the difference is inverted, and a mechanism for determining the speed at which the hot water supply valve and the cold water supply valve are opened and closed, according to the selected characteristic. The control mechanism controls the actuating mechanism to open and close the hot water supply valve and the cold water supply valve at the determined speed.

6 Claims, 6 Drawing Sheets

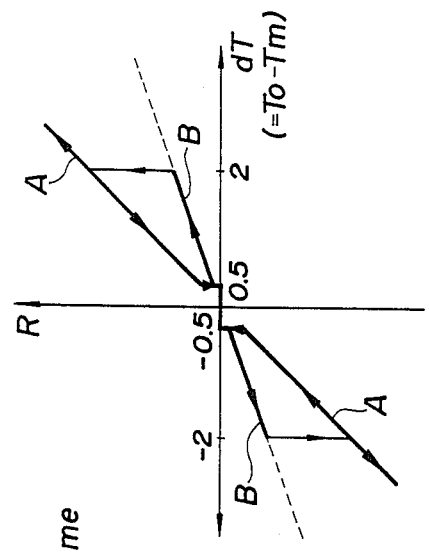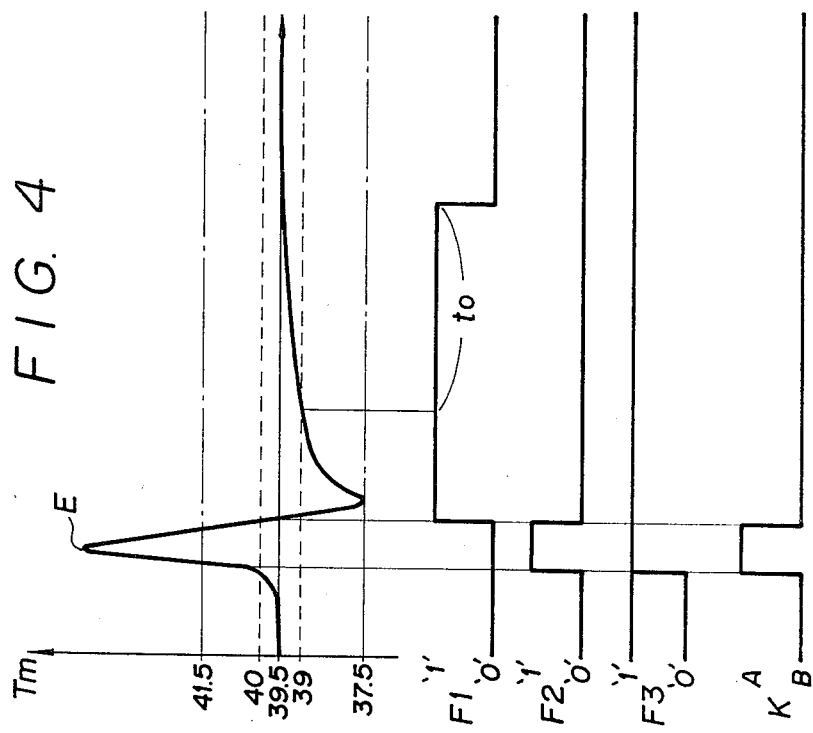

HOT/COLD WATER MIXING DEVICE

BACKGROUND OF THE INVENTION

1. Field of the Invention:

The present invention relates to a hot/cold water mixing device, and more particularly to a hot/cold water mixing device including a hot water supply valve and a cold water supply valve which can mechanically or operatively be opened and closed in a complementary fashion, the speeds of opening and closing of the supply valves being determined on the difference between the actual temperature of hot water flowing out of a water outlet and a desired hot water temperature.

2. Description of the Relevant art:

There is known a hot/cold water mixing device for discharging hot water at a desired temperature To from the faucet of a bathtub, for example, the hot/cold water mixing device having a hot water supply valve and a cold water supply valve which can mechanically or operatively be opened and closed complementarily, the speeds of opening and closing of the supply valves being determined dT on the difference between the actual measured temperature Tm of the hot water flowing out of the faucet and the desired hot water temperature To. The hot water supply valve is disposed between a source of relatively hot water and the faucet, and the cold water supply valve is disposed between a source of relatively cold water and the faucet. In reality, the valves are held in communication with the faucet through a water mixture pipe. The hot/cold water mixing device has an improved capability for making hte measured temperature Tm to be highly responsive to the desired temperature To set by the operator.

More specifically, the hot water supply valve and the cold water supply valve are mechanically interlinked such that when one of the valves is driven so as to be closed at a certain speed R, the other valve is simultaneously driven so as to be opened at a speed - R. The amount of hot water supplied to the bathtub is set at will by the operator, and cannot be controlled by the hot/-cold water mixing device. In practice, the hot water source and the cold water source are connected to a hot water faucet in a kitchen through another hot/cold water mixing device of identical design. The hot/cold water mixing device has a mechanism for determining the speed R in order to provide a prescribed gain with respect to the difference dT, and a drive mechanism for opening and closing the hot water supply valve and the cold water supply valve in an interlinked fashion based on the determined speed R. The speed determining mechanism is in the form of a one-chip microcomputer having a CPU, a RAM, a ROM, and other integral components. The prescribed gain is of a relatively small value in order to prevent the valve drive mechanism from hunting in the neighborhood of the desired temperature To. The speeds R, - R of opening and closing the valves are determined in proportion to the difference dT. Therefore, the response of the measured temperature Tm to the desired temperature To in the hot/-cold water mixing device is better than that in an early hot/cold water mixing device of the type in which the hot water supply valve and the cold water supply valve are opened and closed in an interlinked manner at a constant speed irrespective of the difference dT. The condition in which the measured temperature Tm remains substantially equal to the desired temperature To over a certain period of time is referred to as a stable hot water discharge condition.

Since the gain referred to above is of a relativley small value, a relatively high valve opening and closing speed R is not attained even when the measured temperature Tm is varied due to an abrupt change in the pressure of water from the hot or cold water source during the stable hot-water temperature condition. One example of such an abrupt change in the pressure of water from the hot water source may be a pressure buildup caused when a higher setting is given for the desired temperature To and the hot water faucet in a kitchen that has been open is abruptly closed. When this happens, therefore, a relatively long interval of time is required until the measured temperature Tm in the hot/cold water mixing device for a bathtub returns to the desired temperature To. This problem could be solved by setting a relativley large value for the above gain. However, the valve drive mechanism and hence the measured temperature Tm would tend to suffer hunting in the vicinity of the desired temperature To.

The present invention has been made in an effort to eliminate the aforesaid drawbacks of the conventional hot/cold water mixing device.

SUMMARY OF THE INVENTION

It is an object of the present invention to provide a hot/cold water mixing device which can prevent a valve drive mechanism and hence a measured temperature Tm from hunting from hunting in the vicinity of a desired temperature To, and which allows the measured tempreature Tm to return or converge to the desired temperature To within as short a period of time as possible when the pressure of water from a hot or cold water source is varied.

The above object can be achieved by a hot/cold water mixing device comprising a water outlet, a hot water feed pipe coupled to a source of water of a relatively high temperature, a cold water feed pipe coupled to a source of water of a relatively low temperature, a water mixture pipe connected between the hot and cold water feed pipes and the water outlet, a hot water supply valve disposed in the hot water feed pipe for regulating the amount of hot water passing therethrough, a cold water supply valve disposed in the cold water feed pipe for regulating the amount of cold water passing therethrough, an actuating mechanism for opening and closing the hot and cold water supply valves complementarily to each other, a detecting mechanism for detecting the temperature of water in the water mixture pipe, an operating mechanism for setting a desired temperature for water discharged from the water outlet, and a control mechanism responsive to a detected signal from the detecting mechanism and an operating signal from the operating mechanism for controlling the actuating mechanism, the control mechanism comprising means for determining the difference between the desired temperature and the measured temperature based on the detected signal from the detecting mechanism and the operating signal from the operating mechanism, means for storing a plurality of characteristics including, at least, a first characteristic having a relatively small gain with respect to the difference and a second characteristic having a relatively large gain with respect to the difference, characteristic selecting and maintaining means for selecting and maintaining the second characteristic when the absolute value of the difference exceeds a relatively large first value and for selecting and maintaining the first characteristic when the sign of the difference is inverted, and means for determining the speed at which the hot water supply valve and the cold water supply valve are opened and closed, according to the selected characteristic, the control mechanism being arranged to control the actuating mechanism to open and close the hot water supply valve and the cold water supply valve at the determined speed.

The characteristic selecting and maintaining means includes means for detecting a stable hot water discharge condition in which the difference is smaller than a relatively small second value over a prescribed period of time after the sign of the difference has been inverted, the characteristic selecting and maintaining means being arranged to maintain the first characteristic until the stable hot water discharge condition is detected by the detecting means.

The prescribed amount is a maximum amount of opening of the hot water supply valve.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 4 is a timing chart of a measured temperature Tm, flags, and two valve opening/closing characteristics of different gains, which are obtained by the processing of FIGS. 2 and 3;

FIG. 5 is a graph showing the relationship between a difference dT and the two valve opening/closing characteristics shown in FIG. 4;

DETAILED DESCRIPTION OF THE PREFERRED EMBODIMENTS

Figure 2:
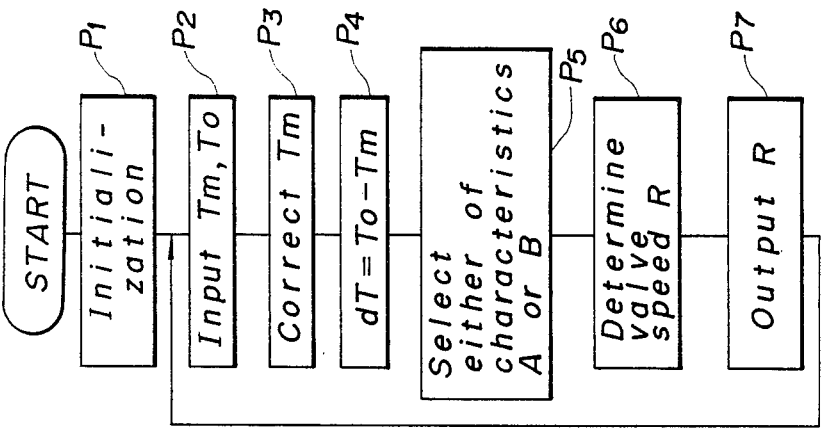
FIG. 2 is a flowchart of a control sequence effected by a control mechanism in the hot/cold water mixing device.

Like or corresponding parts are denoted by like or corresponding reference numerals throughout several views.

Figure 1:
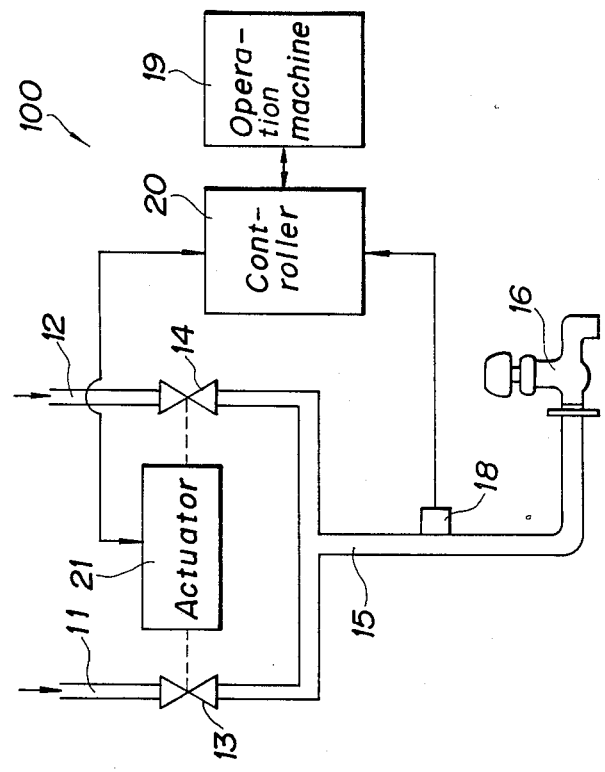
FIG. 1 is a schematic view, partly in block form, of a hot/cold water mixing device according to a first embodiment of the present invention.

FIG. 1 shows a hot/cold water mixing device, generally designated by the reference numreal 100, according to a first embodiment of the present invention. The hot/cold water mixing device 100 has a hot water supply valve 13 coupled to a hot water feed pipe 11 connected to a source (not shown) of hot water, and a cold water supply valve 14 coupled to a cold water feed pipe 12 connected to a source (not shown) of cold water. Hot water of a relatively high temperature is supplied from the hot water source to the hot water feed pipe 11, and cold water of a relatively low temperature is supplied from the cold water source to the cold water feed pipe 12. The valves 13, 14 are operatively connected to an actuator 21 having a motor (not shown), etc., which mechanically opens and closes the valves 13, 14 in a complementary manner. That is, when one of the valves is driven by the actuator 21 so as to be closed at a certain speed R, the other valve is simultaneously driven by the actuator 21 so as to be opened at a speed - R. The rates of flow of hot and cold water from the hot and cold water sources are regulated by the valves 13, 14, respectively. The hot water that has passed through the valve 13 and the cold water that has passed through the valve 14 are then led through a water mixture pipe 15 to a faucet 16, from which the mixed water is supplied to a bathtub, for example.

The actuator 21 is controlled by a controller 20 comprising a one-chip microcomputer having a CPU, a RAM, a ROM, and other integral components. The controller 20 is supplied with a detected signal from a temperature sensor 18 which measures the temperature Tm of water in the water mixture pipe 15. The controller 20 is also supplied with a signal indicating a preset desired temperature To and a signal from an operation machine 18 for starting and stopping the hot/cold water mixing device 100, the operation machine 19 being operated by an operator. As described later on, the controller 20 and the actuator 21 cooperate with each other in selecting one of two valve opening/closing speed characteristics A, B as shown in FIG. 5 based on the difference dT between a desired temperature To and a measured temperature Tm, and in mechanically opening and closing the valves 13, 14 complementarily according to the selected speed characteristic. The speed characteristic A has a relatively large gain, whereas the speed characteristic B has a relatively small gain. The speed characteristics A, B have a dead zone in the range: $-0.5° C. \leq dT \leq 0.5° C.$ in which the speed R is zero. The controller 20 serves to store various data items, select one of the speed characteristics A, B, hold the selected speed characteristic, and determining the valve opening and closing speed R.

FIG. 2 schematically shows an control sequence carried out by the controller 20. The desired temperature To will hereinafter be described as 39.5° C. by way of example only, but is not limited to such a temperature in practice.

When the electric power supply of the device 100 is turned on, the control sequence shown in FIG. 2 is started.

First, various variables and flags are initialized in a step P1. More specifically, flags F1, F2 are initialized as F1="1", F2="0", and a flag F3 is initialized as F3="0" as a default value. A characteristic B having a relatively small gain is set as an initial value of the valve opening/closing speed characteristic K. The flags F1 through F3 are basically of the following nature, with dT=To−Tm:

F1="1": when the absolute value of the difference dT is 0.5 or below, i.e., when the condition |dT|≦0.5 continues for a stable period of time t0 or more (This condition will hereinafter be referred to as a stable hot water discharge condition.);

F1="0": when the absolute value of the difference dT is otherwise;

F2="1": when |dT|>2 (upon pressure variation);

F2="0": when 2≧|dT|>0 (while the gain B is being selected, i.e, during normal processing);

F3="1": when dT>2° C., i.e., when the condition in which the measured temperature Tm is higher than the desired temperature To is caused once;

F3="0": when dT>1 2° C., i.e., when the condition in which the measured temperature Tm is lower than the desired temperature To is caused once.

The flag F1 will hereinafter be referred to as a stability flag. The flag F2 will hereinafter be referred to as a variable flag as it indicates a variation in the difference dT arising from a variation in the pressure of water from the hot or cold water source. The flag F3 will hereinafter be referred to as an inversion flag since it is used to ascertain whether the sign of the difference dT is inverted or not.

In a step P2, the temperature Tm of the water flowing through the water mixture pipe 15 is supplied from the temperature sensor 18, and the desired temperature To is supplied from the operation machine 19.

A next step P3 corrects the measured temperature Tm according to the differential and addition process: Tm=Tmf+K1 (dTm/dt) where Tmf represents a present measured temperaure, dTm/dt a differential of the measured temperature Tm with respect to time, and K1 a constant inherent in the temperature sensor 18.

A step P4 determines the difference dT (=To−Tm) between the desired temperature To read in the step P2 and the measured temperature Tm determined in the step P3.

Figure 3:
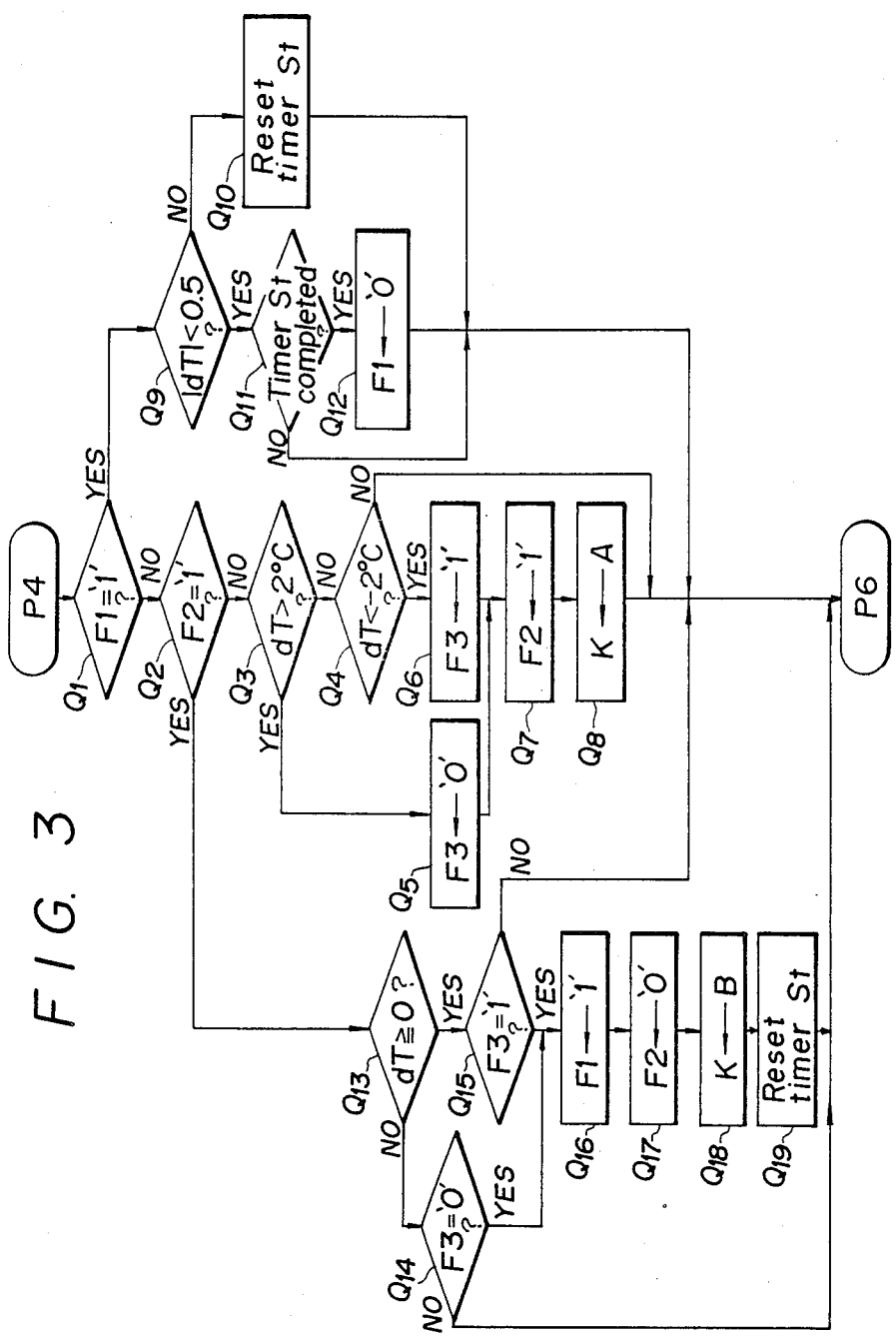
FIG. 3 is a flowchart of a process in the control sequence of FIG. 2 for selecting a valve opening/closing speed characteristic.

A step P5 selects one of the two speed characteristics A, B shown in FIG. 5 as the valve opening/closing speed characteristic K according to steps Q1 through Q19 as illustrated in FIG. 3.

A step P6 determines the value of the valve opening/closing speed R from the difference dT based on the selected speed characteristic A or B.

In a step P7, a control signal is applied from the controller 20 to the actuator 21 for complementarily opening and closing the hot water supply valve 13 and the cold water supply valve 14 at the determined speed R.

When dT is of a certain positive value, since dT=To−Tm, To−Tm>0 and hence To>Tm. This means that the temperature Tm of water supplied from the faucet 16 is lower than the desired temperature To. Therefore, the actuator 21 is controlled in the step P7 such that the hot water supply valve 13 is continuously driven at the determined speed R (>0) in an opening direction and the cold water supply valve 14 is continuously driven at the speed - R in a closing direction. When one of the characteristics A, B is selected, the speed R can easily be calculated once the difference dT is given as the gain of each of the characteristics A, B is constant. However, the speed R may be found from a data table stored in the ROM, instead of calculating the speed R.

After the step P7, control goes back to the step P2.

FIG. 3 shows a detailed flowchart of a process for selecting the valve opening/closing speed characteristic K in the step P5.

A step Q1 ascertains whether the stability flag F1 is set to "1" or not. If set to "1", then control jumps to a step Q9, and if not, then control goes to a step Q2.

The step Q2 checks whether the variation flag F1 is "1" or not. If set to "1", then control jumps to a step Q13, and if not, then control proceeds to a step Q3.

The step Q3 ascertains if the difference dT is greater than 2° C. or not. If so, control goes to a step Q5 in which the inversion flag F3 is reset to "0", and if not, control goes to a step Q4 which checks if the difference dT is smaller than −2° C. If smaller than −2° C., then the inversion flag F3 is set to "1" in a step Q6. If not, then control leaves the flowchart of FIG. 3, and goes to the step P6 shown in FIG. 2. For example, when F1="1", F2="0", and −2° C.≦dT≦2° C., control goes right through the steps Q1, Q2, Q2, and Q4 each time it reaches the step P5.

After the steps Q5 and Q6, control proceeds to a step Q7 in which the variation flag F2 is set to "1". Then, the speed characteristic A of a larger gain is selected as the value opening/closing speed characteristic K in a step Q8, which is followed by the step P6 shown in FIG. 2.

In the steps Q3 through Q6, when the absolute value |dT| of the difference dT is larger than 2, the variation flag F2 is set to "1" and the speed characteristic A of a larger gain is selected as the value opening/closing speed characteristic K. Therefore, the opening and closing speeds of the valves 13, 14 are increased, so that the measured temperature Tm can quickly reach the desired temperature To.

The step Q9 determines if the absolute value |dT| of the difference dT is smaller than 0.5 or not. Stated otherwise, the spep Q9 checks if the measured temperature Tm has substantially reached the desired temperature To. If yes, then control goes to a step Q10, and if not, then control goes to a step Q11. The step 10 resets a stability timer St, and then control goes to the step P2 of FIG. 2.

The step Q11 ascertains whether the stability timer St has completed the counting of a prescribed time t0. If yes, control goes to a step Q12 in which the stability flag F1 is reset to "0". If not, control directly goes to the step P2 of FIG. 2. The stability timer which is reset in the step Q10 comprises a software-implemented timer which starts counting the prescribed time t0 each time it is reset, and sets a timeover flag (not shown) to "1" when the counting is finished. The timeover flag is reset to "0" at the same time that the stability timer St is reset.

With the stability flag F1 being "1" and while the absolute value |dT| of the difference dT is approaching 0.5 from a relatively large value, control goes through the steps Q1, Q9, and Q10. Therefore, the stability timer St is repeatedly reset. Where the absolute value |dT| once becomes smaller than 0.5, control goes from the step Q9 to the step Q11. Control repeatedly passes through the steps Q1, Q9, Q11, P6 until the counting of the time t0 by the stability timer S5 is completed. At the time the stability timer St has just completed the counting of the time t0, control goes from the step Q11 to a step Q12 in which the stability flag F1 is reset to "0". Thus, when the condition in which the measured temperature Tm has substantially reached the desired temperature To continues for the time t0, the temperature Tm of the water from the faucet 16 is judged as being stable, and the stability flag F1 is reset to "0". When control reaches again to the step Q1 thereafter, therefore, control goes from the step Q1 to the step Q2.

The step Q13 ascertains whether the difference dT is positive (+) or not, i.e., checks the sign of the difference dT (dT=To−Tm). If dT is not positive, then control goes to a step Q14, and if positive, then control goes to a step Q15. The step Q14 ascertains whether the inversion flag F3 is "0" or not, whereas the step Q15 ascertains whether the inversion flag F3 is "1" or not. If the flag F3 is not "0" in the step Q14, and if the flag F3 is not "1" in the step Q15, then control goes to the step P6 of FIG. 2. If the flag F3 is "0" in the step Q14, and if the flag F3 is "1" in the step Q15, then control goes from the steps Q14, Q15 to a step Q16.

The inversion flag F3 can be interpreted as being set according to the sign of dT at the time, in the step Q5 or Q6. When the sign of the difference dT is inverted by the processing of the steps Q13, Q14, Q15, control goes to the step Q16.

When control goes to the step Q13 through the steps Q1, Q2, the conditions F1="1" and F2="1" have been established. These conditions indicate that the absolute value |dT| of the difference dT once becomes 2 or greater for some reason under the stable hot water discharge condition. When these conditions are met, control once goes through the steps Q3 through Q8 to select the valve speed characteristic A. It is now assumed that 39.5° C. is selected as the desired temperature To and the pressure of hot water from the hot water source is increased for some reason. In this case, the sign of the difference dT is negative. Therefore, the hot water supply vavle 13 is driven so as to be closed at a relatively high speed R, and the cold water supply valve 14 is driven so as to be opened at a speed - R. As a result, the measured temperature Tm passes through a maximum point E (FIG. 4) and then quickly approaches the desired temperature To. When the water pressure varies as shown in FIG. 4, control goes through the steps Q1, Q2, Q13, Q14, and thereafter directly goes to the step P6 of FIG. 2 until the measured temperature Tm approaches the desired temperature To. Conversely, wehn the water pressure from the cold water source is abruptly increased, control goes through the steps Q1, Q2, Q13, Q15, and thereafter directly goes to the step P6 of FIG. 2.

Where the measured temperature Tm thus approaches and reaches the desired temperature To, the measured temperature Tm goes of necessity beyond the desired temperature To. Therefore, the sign of the difference dT is inverted. When this happens, control goes to the step Q16.

In the step Q16 and following steps Q17, Q18, Q19, the stability flag F1 is set to "1", the variation flag F2 is rest to "0", the speed characteristic B having a smaller gain is selected as the valve opening/closing speed characteristic K, and the stability timer St is reset, respectively. After the step Q19, control goes to the step P6 of FIG. 2.

In the hot/cold water mixing device shown in FIG. 1, the absolute value |dT| of the difference dT varies greatly in excess of 2 due to an abrupt pressure variation of the water from the hot or cold water source. According to the control processing as illustrated in FIGS. 2 and 3, when the water pressure varies relatively largely to cause the absolute value |dT| of the difference dT to exceed 2, for example, the valve speed characteristic A of a relatively large gain is selected, and when the measured temperature Tm exceeds the desired temperature To to invert the sign of the difference dT, the valve speed characteristic B of a relatively small gain is selected. Consequently, the measured temperature Tm varies as shown in FIG. 4. That is, when the pressure of the water from the hot or cold water source is subjected to a large change, the measured temperature Tm is allowed to return or converge to the desired temperature To within as short a period of time as possible while preventing the valve actuating mechanism or actuator 21 and hence the measured temperature Tm from hunting. The dead zone of the characteristics A, B in the range: −0.5° C.≦dT≦0.5° C. is effective in preventing such hunting.

In the above embodiment, one of the two chararacteristics A, B is selected at a time as the valve opening/closing speed characteristic K. However, it is also possible to establish third, fourth, and/or other characteristics having gains greater than that of the characteristic A. For example, where only a third characteristic is added, it is selected when the absolute value |dT| of the difference dT is in excess of 10, for example, which is sufficiently larger than 2, while the characteristic A is being selected. When the sign of dT is inverted, the characteristic B having the smallest gain is selected instead of the third characteristic.

In a hot/cold water mixing device with its hot and cold water supply valves are driven in the same manner as the above hot/cold water mixing device 100, when the faucet remains closed for some time, the hot water supply valve is in a limit position on the open side and the cold water supply valve is in a limit position on the closed side. This is because the temperature of water remaining in the water mixture pipe drops to room temperature, so that the measured temperature is continuously lower than the desired temperature. As a consequence, when the faucet is opened again (hereinafter referred to as a cold start), first low-temperature water which has remained in the water mixture pipe is discharged, and then hot water with its temperature higher than the desired temperature is discharged from the faucet. Inasmuch as the hot water supply valve is in the limit position on the open side at first, as described above, a relatively long period of time is required before the measured temperature reaches the desired temperature.

Figure 7:
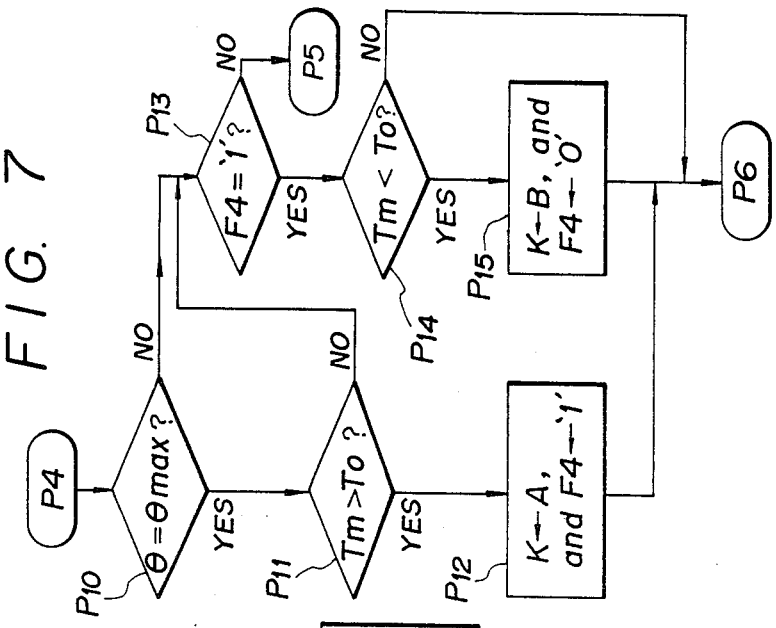
FIG. 7 is a flowchart of a control sequence effected by a control mechanism in the hot/cold water mixing device illustrated in FIG. 6.
Figure 6:
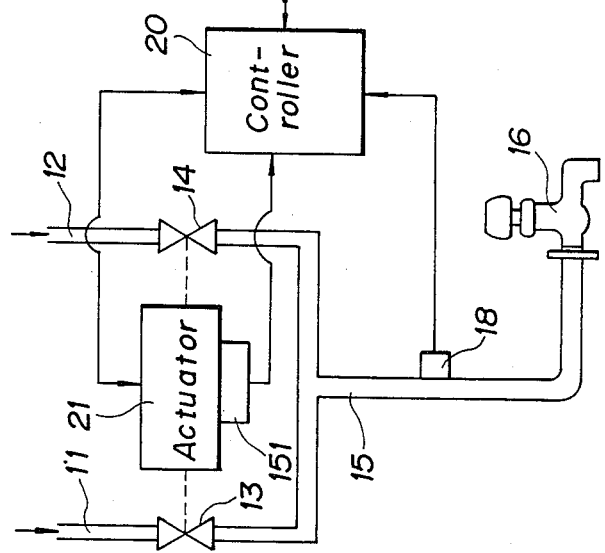
FIG. 6 is a schematic view, partly in block form, of a hot/cold water mixing device according to a modification of the present invention.
Figure 8:
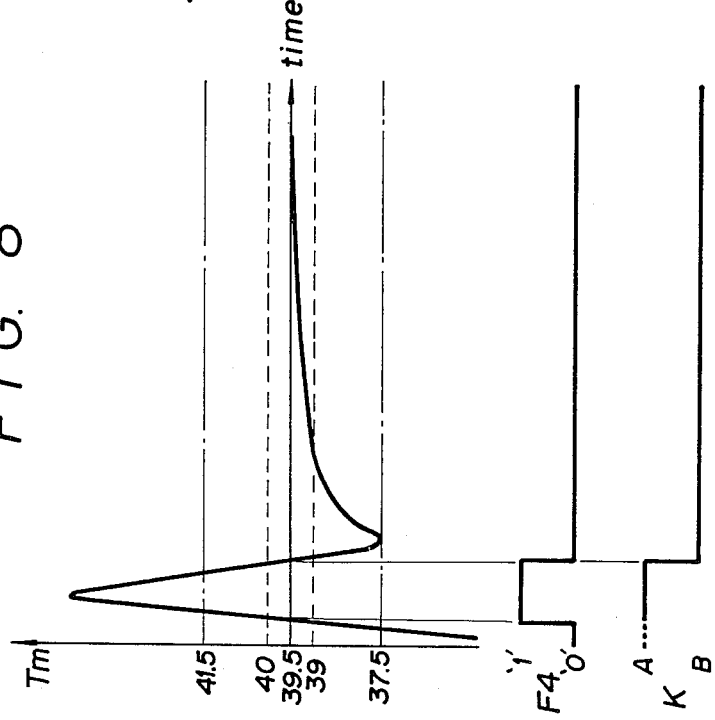
FIG. 8 is a timing chart of a measured temperature Tm, a fourth flag, and the two valve opening/closing characteristics of different gains, which are obtained by the processing of FIG. 7.

FIGS. 6 through 8 illustrate a modified hot/cold water mixing device 150 capable of causing the measured temperature to reach the desired temperature within a relatively short period of time at a cold start.

As shown in FIG. 6, the hot/cold water mixing device 150 has a potentiometer 151 associated with the actuator 21 for detecting the amount of opening of the hot and cold water supply valves 13, 14. The potentiometer 151 applies its detected signal to the controller 20. Actually, only the amount θ of opening of either one of the valves 13, 14 is detected by the potentiometer 151.

The controller 20 of the hot/cold water mixing device 150 executes steps P10 through P15 shown in FIG. 7 after the step P4 shown in FIG. 2.

A step P10 ascertains whether the amount θ of opening of the hot water supply valve 13 is in a limit position θmax on the open side (practically, a fully open position) based on the output signal from the potentiometer 151. If yes, then control goes to a step P11, and if not, then control goes to a step P13.

The step P11 checks if the measured temperature Tm is higher than the desired temperature To. If yes, then control proceeds to a step P12, and if not, then control goes to the step P13.

The step P12 forcibly selects the characteristic A shown in FIG. 5 as the valve opening/closing speed characteristic K and sets a fourth flag F4 to "1". Thereafter, control goes from the step P12 to the step P6 of FIG. 2. The fourth flag F4 is set to "1" when the faucet 16 is opened and the measured temperature Tm exceeds the desired temperature To after the hot water supply valve 13 has once been placed in the fully open position.

The step P13 ascertains whether the fourth flag F4 is set to "1" or not. If yes, then control goes to a step P14, and if not, then control proceeds to the step P5 of FIG. 2, i.e., the step Q1 shown in FIG. 3.

The step P14 checks if the measured temperature Tm is lower than the desired temperature To. If yes, then control goes to a step P15, and if not, then control goes to the step P6 of FIG. 2.

The step P15 selects the characteristic B shown in FIG. 5 as the valve opening/closing speed characteristic K and resets the fourth flag F4 to "0". Thereafter, control goes from the step P15 to the step P6 of FIG. 2.

FIG. 8 shows the manner in which the measured temperature Tm varies with time upon a cold start of the hot/cold water mixing device 150, with 39.5° C. being used as the desired temperature To.

When the desired temperature To is set as a maximum temperature, the hot water supply valve 13 may be intentionally fully opened even if the hot/cold water mixing device is not operated on a cold start. In this case, however, the measured temperature Tm is not actually in excess of the desired temperature To. Therefore, control goes from the steps P10, P11 to the step P13. The fourth flag F4 is set to "1" in the step P12 only when Tm>To upon a cold start. Consequently, when the hot water supply valve 14 is intentionally fully opened, control goes from the step P13 to the step P5. As a result, the valve opening/closing speed characteristic K is ordinarily selected as shown in FIG. 3.

According to the above processing, at a cold start and after the measured temperature Tm once exceeds the desired temperature To, control repeatedly passes through the steps P4, P10, P14, P14, P6 until Tm<To. It should be noted that the hot water supply valve 13 is driven from the fully open position to the fully closed position at the same time the measured temperature Tm exceeds the desired temperature To. During this time, the characteristic A of a relatively large gain is selected and maintained. As a consequence, as shown in FIG. 8, the measured temperature Tm reaches the desired temperature To within a relatively short period of time even upon a cold start. The valve actuating mechanism or actuator and hence the measured temperature Tm are prevented from hunting.

Figure 9:
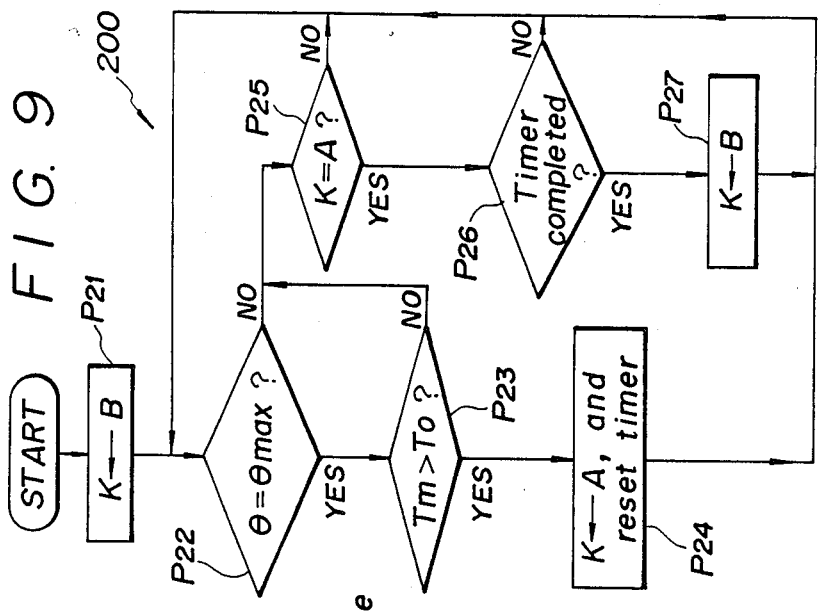
FIG. 9 is a flowchart of a control sequence effected by a control mechanism in a hot/cold water mixing device according to a second embodiment of the present invention.

FIG. 9 shows a control sequence for a hot/cold water mixing device 200 according to a second embodiment of the present invention. The hot/cold water mixing device 200 is arranged to cause the measured temperature Tm to reach the desired temperature To within as short a period of time as possible upon a cold start. The mechanical details of the hot/cold water mixing device 200 are the same as those of the hot/cold water mixing device 150 shown in FIG. 15.

The controller 20 of the device 200 executes steps P21 through P27 shown in FIG. 9, with the steps P2, P3, P4, P6, and P7 of FIG. 2 being omitted from illustration.

A step P21 selects the characteristic B of a relatively small gain (FIG. 5) as the valve opening/closing speed characteristic K.

A step P22 ascertains whether the amount $\theta$ of opening of the hot water supply valve 13 is in a limit position $\theta$max on the open side (practically, a fully open position) based on the output signal from the potentiometer 151. If yes, then control goes to a step P23, and if not, then control goes to a step P25.

The step P23 checks if the measured temperature Tm is higher than the desired temperature To. If yes, then control proceeds to a step P24, and if not, then control goes to the step P25.

Figure 10:
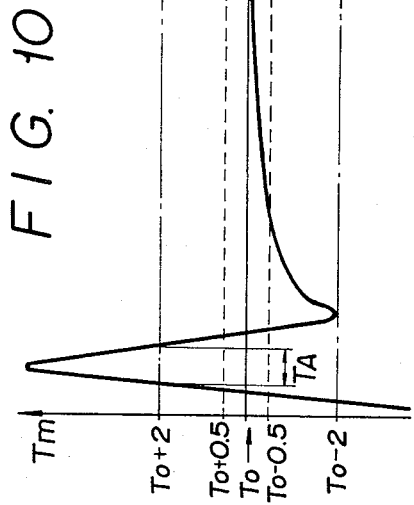
FIG. 10 is a timing chart of a measured temperature Tm obtained by the processing of FIG. 9.

The step P24 selects the characteristic A shown in FIG. 5 as the valve opening/closing speed characteristic K and resets a timer for measuring a prescribed hold time TA of such a length as shown in FIG. 10. Thereafter, control goes through the same steps as the steps P6, P7, P2, P3, P4 shown in FIG. 2 to the step P22.

The step P25 ascertains whether the characteristic A is selected as the valve opening/closing speed characteristic K. If yes, then control proceeds to a step P26, and if not, then control goes through the same steps as the steps P6, P7, P2, P3, P4 shown in FIG. 2 to the step P22.

The step P26 ascertains whether the timer reset in the step P24 has completed counting time. If yes, then control goes to a step P27. If not, then control goes through the same steps as the steps P6, P7, P2, P3, P4 shown in FIG. 2 to the step P22.

The step P27 selects the characteristics B as the valve opening/closing speed characteristic K. Thereafter, control goes through the same steps as the steps P6, P7, P2, P3, P4 shown in FIG. 2 to the step P22.

FIG. 10 shows the manner in which the measured temperature Tm varies with time upon a cold start of the hot/cold water mixing device 200.

Figure 11:
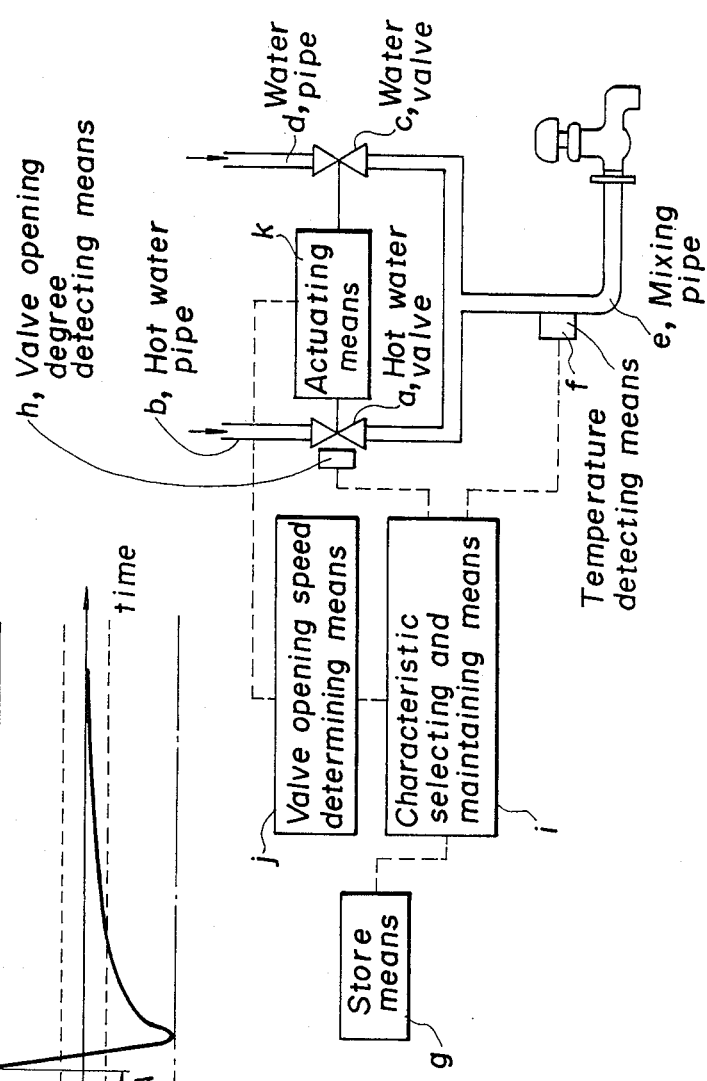
FIG. 11 is a schematic view, partly in block form, of the hot/cold water mixing device according to the second embodiment of the present invention.

FIG. 11 shows the hot/cold water mixing device 200 partly in block form. The controller 20 corresponds to store means g, valve speed characteristic selecting and maintaining means i, and valve speed determining means j. The actuator 21 corresponds to actuating means k. The potentiometer 151 corresponds to valve opening degree detecting means h. The temperature sensor 18 corresponds to temperature detecting means f.

According to the processing of the steps P21 through P27, the characteristic A of a relatively large gain is selected when the hot water supply valve 13 is fully open and the measured temperature Tm is higher than the desired temperature To upon a cold start. The characteristic A is maintained for the time TA which is measured by the timer reset in the step P24. Therefore, the valve opening/closing speed R determined from the characteristic A is relatively high. As a result, the valves 13, 14 are actuated at a relatively high speed to enable the measured temperature Tm to reach the desired temperature To within as short a period of time as possible without allowing the measured temperature Tm to suffer hunting as shown in FIG. 10. When the hot/cold water supply device 200 is not operated on a cold start, the characteristic B is selected in the step P27, whereby the valve opening/closing speed R becomes relatively low. As a consequence, the rate of change of the measured temperature Tm with respect to time is small, and the user does not feel any inconvenience in using the device.

While the faucet 16 has been described as a water outlet, any of various other units such as a shower cock may be used as a water outlet instead of the faucet 16.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A hot/cold water mixing device comprising:
   a water outlet;
   a hot water feed pipe coupled to a source of water of a relatively high temperature;
   a cold water feed pipe coupled to a source of water of a relatively low temperature;
   a water mixture pipe connected between said hot and cold water feed pipes and said water outlet;
   a hot water supply valve disposed in said hot water feed pipe for regulating the amount of hot water passing therethrough;
   a cold water supply valve disposed in said cold water feed pipe for regulating the amount of cold water passing therethrough;
   an actuating mechanism for opening and closing said hot and cold water supply valves complementarily to each other;
   a detecting mechanism for detecting the temperature of water in said water mixture pipe;
   an operating mechanism for setting a desired temperature for water discharged from said water outlet;
   a control mechanism responsive to a detected signal from said detecting mechanism and an operating signal from said operating mechanism for controlling said actuating mechanism;
   said control mechanism comprising:
   means for determining the difference between said desired temperature and said measured temperature based on said detected signal from said detecting mechanism and said operating signal from said operating mechanism;
   means for storing a plurality of characteristics including, at least, a first characteristic having a relatively small gain with respect to said difference and a second characteristic having a relatively large gain with respect to said difference;
   characteristic selecting and maintaining means for selecting and maintaining said second characteristic when the absolute value of said difference exceeds a relatively large first value and for selecting and maintaining said first characteristic when the sign of said difference is inverted;
   means for determining the speed at which said hot water supply valve and said cold water supply valve are opened and closed, according to the selected characteristic; and
   said control mechanism being arranged to control said actuating mechanism to open and close said hot water supply valve and said cold water supply valve at said determined speed.

2. A hot/cold water mixing device according to claim 1, wherein said characteristic selecting and maintaining means includes means for detecting a stable hot water discharge condition in which said difference is smaller than a relatively small second value over a prescribed period of time after the sign of said difference has been inverted, said characteristic selecting and maintaining means being arranged to maintain said first characteristic until said stable hot water discharge condition is detected by said detecting means.

3. A hot/cold water mixing device according to claim 1, wherein said first and second characteristics have a dead zone in a range in which the absolute value of said difference is smaller than a relatively small second value.

4. A hot/cold water mixing device according to claim 1, wherein said control mechanism further includes means for detecting the amount of opening of said hot water supply valve, said characteristic selecting and maintaining means being arranged to select said second characteristic when said measured temperature is higher than said desired temperature with said detecting means detecting that said amount of opening of said hot water supply valve exceeds a relatively large prescribed amount, and to maintain said second characteristic until said measured temperature becomes lower than said desired temperature.

5. A hot/cold water mixing device according to claim 4, wherein said prescribed amount is a maximum amount of opening of said hot water supply valve.

6. A hot/cold water mixing device comprising:
   a water outlet;
   a hot water feed pipe coupled to a source of water of a relatively high temperature;
   a cold water feed pipe coupled to a source of water of a relatively low temperature;
   a water mixture pipe connected between said hot and cold water feed pipes and said water outlet;
   a hot water supply valve disposed in said hot water feed pipe for regulating the amount of hot water passing therethrough;
   a cold water supply valve disposed in said cold water feed pipe for regulating the amount of cold water passing therethrough;
   an actuating mechanism for opening and closing said hot and cold water supply valves complementarily to each other;
   means for detecting the amount of opening of said hot water supply valve;
   a detecting mechanism for detecting the temperature of water in said water mixture pipe;
   an operating mechanism for setting a desired temperature for water discharged from said water outlet;
   a control mechanism responsive to a detected signal from said detecting mechanism and an operating signal from said operating mechanism for controlling said actuating mechanism;
   said control mechanism comprising:
   means for determining the difference between said desired temperature and said measured temperature based on said detected signal from said detecting mechanism and said operating signal from said operating mechanism;
   means for storing a plurality of characteristics including, at least, a first characteristic having a relatively small gain with respect to said difference and a second characteristic having a relatively large gain with respect to said difference;
   characteristic selecting and maintaining means for selecting said second characteristic and maintaining the same for a prescribed period of time when said measured temperature is higher than said desired temperature with said detecting means detecting that said amount of opening of said hot water supply valve exceeds a relatively large prescribed amount, and for selecting and maintaining said first characteristic upon elapse of said prescribed period of time;

means for determining the speed at which said hot water supply valve and said cold water supply valve are opened and closed, according to the selected characteristic; and said control mechanism being arranged to control said actuating mechanism to open and close said hot water supply valve and said cold water supply valve at said determined speed.

* * * * *

UNITED STATES PATENT AND TRADEMARK OFFICE
CERTIFICATE OF CORRECTION

PATENT NO. : 4,739,923

DATED : April 26, 1988

INVENTOR(S) : Osamu Tsutsui et al.

It is certified that error appears in the above-identified patent and that said Letters Patent is hereby corrected as shown below:

Column 1, line 33, "het" should read --the--.

Column 2, line 30, delete --from hunting-- (second occurrence).

Column 4, line 2, "numreal" should read --numeral--.

Column 4, line 53, "an" should read --a--.

Column 6, line 16, "Q2, Q2" should read --Q2, Q3--.

Column 6, line 33, "spep" should read --step--.

Column 7, line 30, "vavle" should read --valve--.

Column 7, line 40, "wehn" should read --when--.

Column 9, line 37, "oridinarily" should read --ordinarily--.

Column 9, line 41, "P14, P14" should read --P13, P14--.

Signed and Sealed this

Twenty-ninth Day of November, 1988

Attest:

DONALD J. QUIGG

Attesting Officer      Commissioner of Patents and Trademarks